US010392793B2

(12) United States Patent
Becker et al.

(10) Patent No.: US 10,392,793 B2
(45) Date of Patent: Aug. 27, 2019

(54) METHOD FOR SETTING UP A WASTEWATER PUMPING STATION IN A WASTEWATER SHAFT, AND ASSOCIATED WASTEWATER PUMPING STATION

(71) Applicant: KSB Aktiengesellschaft, Frankenthal (DE)

(72) Inventors: Michael Becker, Frankenthal (DE); Sebastian Luedemann, Frankenthal (DE)

(73) Assignee: KSB Aktiengesellschaft, Frankenthal (DE)

(*) Notice: Subject to any disclaimer, the term of this patent is extended or adjusted under 35 U.S.C. 154(b) by 8 days.

(21) Appl. No.: 15/029,839

(22) PCT Filed: Oct. 16, 2014

(86) PCT No.: PCT/EP2014/072177
§ 371 (c)(1),
(2) Date: Apr. 15, 2016

(87) PCT Pub. No.: WO2015/055749
PCT Pub. Date: Apr. 23, 2015

(65) Prior Publication Data

US 2016/0265210 A1 Sep. 15, 2016

(30) Foreign Application Priority Data

Oct. 17, 2013 (DE) ........................ 10 2013 221 065

(51) Int. Cl.
*E03F 5/22* (2006.01)
*B01D 35/027* (2006.01)
*E03F 5/10* (2006.01)

(52) U.S. Cl.
CPC ............. *E03F 5/22* (2013.01); *B01D 35/027* (2013.01); *E03F 5/10* (2013.01)

(58) Field of Classification Search
CPC ............. E03F 5/22; E03F 5/10; B01D 35/027
See application file for complete search history.

(56) References Cited

U.S. PATENT DOCUMENTS 2,401,254 A 5/1946 Lannert
2,760,512 A 8/1956 Nechine
(Continued)

FOREIGN PATENT DOCUMENTS

CH 526 689 A 8/1972
CH 526689 A * 8/1972 ................ E03F 5/22
(Continued)

OTHER PUBLICATIONS

International Preliminary Report on Patentability (PCT/IB/373) issued in PCT Application No. PCT/EP2014/072177 dated Apr. 19, 2016, including translation of document C2 (German-language Written Opinion (PCT/ISA/237)) previously filed on Apr. 15, 2016 (ten (10) pages).

(Continued)

*Primary Examiner* — Craig M Schneider
*Assistant Examiner* — Angelisa L. Hicks
(74) *Attorney, Agent, or Firm* — Crowell & Moring LLP

(57) ABSTRACT

A method for setting up a wastewater pumping station in a wastewater shaft and a wastewater pumping station are provided. At least one solids-collecting tank which separates solids from wastewater containing solids, a liquids-collecting tank which received the treated wastewater from the at least one solids collecting tank, and a pump for emptying wastewater from the liquids-collecting tank via the solids-collecting tank, are produced as separate subassemblies. At least the solids-collecting tank and the pump are prefabricated in the form of a construction unit, and the construction (Continued)

unit is combined with the already on-site liquids-collecting tank during installation in the likewise already on-site waste-water shaft.

10 Claims, 4 Drawing Sheets

(56) References Cited

U.S. PATENT DOCUMENTS

| | | | | |
|---|---|---|---|---|
| 3,375,788 A * | 4/1968 | Solas | E03F 5/22 137/364 |
| 3,394,656 A | 7/1968 | Conery | |
| 5,954,484 A | 9/1999 | Strate | |
| 2010/0224271 A1* | 9/2010 | Szuster | E03F 5/22 137/565.17 |

FOREIGN PATENT DOCUMENTS

| | | | |
|---|---|---|---|
| CN | 203097362 U | 7/2013 | |
| CN | 103290918 A | 9/2013 | |
| DE | 1 038 996 B | 9/1958 | |
| DE | 2 065 097 | 6/1972 | |
| DE | 33 33 883 A1 | 3/1985 | |
| DE | 29505028 U1 * | 7/1995 | E03F 5/22 |
| DE | 196 50 625 C1 | 11/1997 | |
| DE | 20 2010 001 472 U1 | 6/2010 | |
| DE | 20 2011 004 561 U1 | 7/2011 | |
| EP | 1 108 822 A1 | 6/2001 | |
| EP | 2 581 508 A1 | 4/2013 | |
| JP | 2004-124582 A | 4/2004 | |
| WO | WO 2010/025852 A1 | 3/2010 | |

OTHER PUBLICATIONS

Chinese-language Office Action issued in counterpart Chinese Application No. 201480056842.7 dated Oct. 17, 2016 with English translation (Fourteen (14) pages).

International Search Report (PCT/ISA/210) issued in PCT Application No. PCT/EP2014/072177 dated Dec. 17, 2014 with English-language translation (seven (7) pages).

German-language Written Opinion (PCT/ISA/237) issued in PCT Application No. PCT/EP2014/072177 dated Dec. 17, 2014 (seven (7) pages).

German Search Report issued in counterpart German Application No. 10 2013 221 065.5 dated Jun. 16, 2014 with partial English-language translation (twelve (12) pages).

German-language Office Action issued in counterpart European Application No. 14 784 472.4 dated Jul. 3, 2017 (5 pages).

Canadian Search Report issued in counterpart Canadian Application No. 2,926,541 dated Nov. 7, 2018 (six (6) pages).

* cited by examiner

METHOD FOR SETTING UP A WASTEWATER PUMPING STATION IN A WASTEWATER SHAFT, AND ASSOCIATED WASTEWATER PUMPING STATION

CROSS REFERENCE TO RELATED APPLICATIONS

This application is a National Phase of PCT International Application No. PCT/EP2014/072177, filed Oct. 16, 2014, which claims priority under 35 U.S.C. § 119 from German Patent Application No. 10 2013 221 065.5, filed Oct. 17, 2013, the entire disclosures of which are herein expressly incorporated by reference.

BACKGROUND AND SUMMARY OF THE INVENTION

The invention relates to a method for setting up a wastewater pumping station in a wastewater shaft.

According to the method, at least one solids collecting tank for wastewater which is guided through the same and is loaded with solids, a liquid collecting tank for the wastewater which has been rid of solids and has been pretreated in the solids collecting tank and a pump which is assigned to the solids collecting tank for emptying the liquid collecting tank via the solids collecting tank are produced as separate assemblies for the most part in each case, i.e., the solids collecting tank, the liquid collecting tank and the pump are able to be produced as three separate assemblies. It is also possible, however, to condense for example the pump and the solids collecting tank to form one assembly. Then, with the liquid collecting tank as a further assembly, a total of two assemblies are realized.

Wastewater pumping stations are generally installed into a wastewater shaft and are utilized to pump wastewater, which has collected at the bottom of a wastewater storage chamber, to a certain level. Further treatment is then effected in the majority of cases in a wastewater treatment plant. Large pumps are frequently used in practice for this purpose, however, the pumps typically have low efficiencies.

A wastewater pumping station where solids are separated from the conveying medium, as a rule the wastewater, is employed in the case of the generic method according to European patent document no. EP 1 108 822 A1. Only after separation does the wastewater, which has been pretreated in such a manner, enter a regularly used pump. The solids collecting tank which is connected upstream of the pump takes care of the described separation of the solids from the wastewater. A separating screen, by which ideally the solids are held back, is typically provided in the interior of the solids collecting tank for this purpose. As a result, pretreated wastewater leaves the solids collecting tank and can be transferred into the liquid collecting tank which is connected downstream of the solids collecting tank.

In the case of the wastewater pumping stations realized in practice, the procedure is generally such that the wastewater shaft, the solids collecting tank, the liquid collecting tank and the pump are all prefabricated and installed at the installation site. For this purpose, European patent document no. EP 1 108 822 A1 proposes in one variant that the liquid collecting tank and the wastewater shaft which receives the wastewater pumping station are produced from plastics material, with the shaft bottom simultaneously forming the bottom of the liquid collecting tank. Industrial prefabrication of the entire wastewater pumping station is able to be realized in this manner, which simplifies installation on site.

However, wastewater shafts produced from plastics material can often not cope with the static and dynamic loads prevailing on site or cannot cope with them in the long term. Wastewater shafts produced from concrete are increasingly used in this context for this reason. This implies production of the wastewater shaft prior to installation of the actual wastewater pumping station because the transport of wastewater shafts produced from concrete is ultimately prohibited for reasons of cost. In this context, European patent document no. EP 1 108 822 A1 already proposes that the solids collecting tank and the liquid collecting tank can be realized as assemblies which are separate from one another by providing a modular construction unit.

Such separate assemblies provide advantages in maintenance and construction because maintenance jobs and also repair jobs can be performed separately from one another on the aforementioned construction elements in the wastewater shaft. This has proved its worth in principle.

However, the handling of the component parts for the wastewater pumping station in particular during transport over large distances requires improvement. This is because individual component parts of the wastewater pumping station such as, in particular, the liquid collecting tank, are particularly bulky and heavy. This is even more valid when, as in the further prior art according to German patent document no. DE 33 33 883 A1, a tank, which is used to receive a pump for a wastewater pumping station, is produced from concrete. Factory-based series production is to be made possible as a result. However, the volumes and weights looked at are exorbitant such that in practice it is not possible to transport the known tanks over long distances. The invention aims to create a remedy here.

The technical problem underlying the invention is to develop further such a method for setting up a wastewater pumping station in a wastewater shaft such that a clear reduction in costs is seen in particular for transport and at the same time the setting up of new stations as well as the renovation of older stations is made easily possible.

To solve said technical problem, a generic method for setting up a wastewater pumping station in a wastewater shaft within the framework of the invention is characterized in that at least the solids collecting tank and the pump are prefabricated as a construction unit and the relevant construction unit is combined with the liquid collecting tank, which is already present on site, in the course of the installation in the wastewater shaft, which is also already present on site.

Within the framework of the invention, the wastewater pumping station is consciously separated into component parts that are present on site and component parts that are prefabricated by the manufacturer. In this case, the component parts that are present on site include not only the wastewater shaft, as has already been publicized in practice and described in the prior art, but also according to the invention said component parts that are present on site also additionally include the liquid collecting tank.

Obviously, it is also possible for several liquid collecting tanks to be present in the wastewater shaft or realized on site if required. In addition, it is within the framework of the invention to combine, for example, several construction units produced in each case from the solids collecting tank and the pump with a liquid collecting tank or even several of said liquid collecting tanks as described. As a result, a parallel operation of, for example, two construction units can be realized in order to obtain, for example, increases in pressure and/or quantities overall. Over and above this, it is also possible on the part of the manufacturer to combine, for example, one solids collecting tank with two or more pumps and likewise several solids collecting tanks with one pump to form the prefabricated construction unit. In each case, the transport costs are significantly reduced because the liquid collecting tanks are typically designed to be bulky and heavy and according to the invention are already realized on site.

To this is added that possible problems with the compressive strength of the liquid collecting tank or also adaptations on site when installing the liquid collecting tank are nonexistent. Apart from this, the investment costs are reduced or can be split in terms of time and function. To this is added that, according to the described method, it is possible both to renovate existing installations and produce new installations. This is because, to do this, all that is necessary is to adapt the construction unit to the liquid collecting tank.

As a result of the separation between the component parts that are present on site and the component parts that are prefabricated (by the manufacturer) when realizing the wastewater pumping station according to the invention, one or several interfaces have ultimately to be worked with. It is provided here within the framework of the invention that the construction unit which is produced from at least the solids collecting tank and the at least one pump, on the one hand, and the liquid collecting tank, on the other hand, are coupled together on site by at least one interface. Said interface can be mounted in or on a partition wall.

The partition wall addressed is arranged, as a rule, in the wastewater shaft. The wastewater shaft is able to be divided into a dry chamber and a wet chamber by the partition wall. The construction unit which is produced from the solids collecting tank and the pump is typically placed in the dry chamber. In contrast, the function of the wet chamber is for receiving the liquid collecting tank that is provided there.

As the construction unit which is produced from at least the solids collecting tank and the pump is designed in a particularly compact manner within the framework of the invention, transport costs can be reduced and, compared to the prior art, it is possible to work with a clearly reduced transport volume. This presupposes at the same time that the liquid collecting tank is produced on site in the interior of the wastewater shaft according to corresponding requirements and in particular the interface between the construction unit and the liquid collecting tank fulfills and also is able to fulfill its function. Effectively, in the simplest case said interface can be a tube coupling, a flange adapter and, where applicable, a feedthrough for the partition wall. This is because, as a rule, the pump is connected to the liquid collecting tank on the suction side by the interface.

In this case, it is also possible over and above this to pass an intake for the construction unit through the liquid collecting tank. The wastewater to be pumped is supplied to the solids collecting tank by said intake. As, consequently, the intake is expediently passed through the liquid collecting tank and also through the partition wall in the interior of the wastewater shaft, it is once again necessary to work with an interface to the relevant solids collecting tank at this location.

On account of said design, it is possible to design the wastewater shaft in a more compact manner and with a smaller shaft height than previously. This is because, as a result of the smaller height of the intake which is passed through the liquid collecting tank compared to the prior art, where the intake is arranged above the liquid collecting tank, the available volume in the wastewater shaft is able to be utilized in an optimum manner.

In addition, mounting and arranging the liquid collecting tank directly in the wastewater shaft provides the possibility of the installation height of the construction unit which is produced from the solids collecting tank and the pump being reduced further. This is because it is possible to integrate a connecting line from the pump to the solids collecting tank and an outlet, which is realized as a by-pass, into the solids collecting tank. The design, in this case, may be comparable to that already described in International patent document no. WO 2010/025852 A1.

It is quite particularly preferred when the liquid collecting tank is integrated into the wastewater shaft on site. That is to say, in the case of the on-site production of, on the one hand, the wastewater shaft and, on the other hand, the liquid collecting tank, the procedure is such that the liquid collecting tank is designed as part of or a component part of the wastewater shaft. In this context, it is recommended that the liquid collecting tank and the wastewater shaft are produced for the most part from uniform materials.

Effectively, such a design corresponds for the most part to the liquid collecting tank and the wastewater shaft comprising several common walls. For example, the liquid collecting tank can be defined in the interior of the wastewater shaft by the already addressed partition wall such that the liquid collecting tank covers simply part of the floor of the wastewater shaft. The liquid collecting tank is consequently defined in the wastewater shaft as an open tub which is able to be closed at the head end by a removable cover.

In this way, the partition wall carries out its dividing function in an automatic manner. This is because the wet chamber is defined in the region of the liquid collecting tank, whereas the dry chamber is available for the arrangement of the construction unit on the other side of the wet chamber and of the partition wall. The modular solids collecting tank and also the at least one pump, both of which are consequently accessible in a particularly simple manner for maintenance and cleaning purposes, are situated in the dry chamber, even during operation.

The construction unit which is produced from at least the solids collecting tank and the pump can be produced from different materials. Metal, plastics material and even concrete have proved possible here, combinations also being included. Comparable materials can also be used for the wastewater shaft and, where applicable, the liquid collecting tank. Concrete, metal, plastics material or combinations can be worked with in this case, too. An object of the invention is also a wastewater pumping station and is set up in a wastewater shaft in particular according to the previously described method.

A method for constructing or setting up a wastewater pumping station in the wastewater shaft and an associated wastewater pumping station, both of which as a result provide particular advantages with regard to costs and logistics, are described. As a result of the modular design of individual component parts and of the separation into component parts which are present on site and component parts which are prefabricated (by the manufacturer), it is possible not only to equip new plants in a corresponding manner but also the renovation of older plants is successful in a particularly advantageous manner. This is because, in this connection, it is only a question of making the wastewater shaft available on site in connection with the liquid collecting tank. In addition, the at least one interface between the liquid collecting tank and the at least one solids collecting tank has to correspond to the requirements.

As a result of the liquid collecting tank being present on site or being realized on site before the construction unit (which is produced from the solids collecting tank and the pump) is installed into the wastewater shaft, it is possible to pass the intake for the construction unit through the liquid collecting tank and also to realize it already on site. In this case, another additional interface, to which the intake is connected, is then necessary between the intake, on the one hand, and the solids collecting tank on the other hand. Low intake heights can be realized as a result and overall the wastewater pumping station can be designed in a particularly compact manner and the shaft height of the wastewater shaft can be reduced to a minimum.

Another advantage to be named is that as a result of the compact design, it is also possible to work with few individual parts and small installation openings in the wastewater shaft, which reduces the costs even further. At the same time, repair and maintenance are simplified. These are the essential advantages.

Other objects, advantages and novel features of the present invention will become apparent from the following detailed description of one or more preferred embodiments when considered in conjunction with the accompanying drawings.

DETAILED DESCRIPTION

Figure 4:
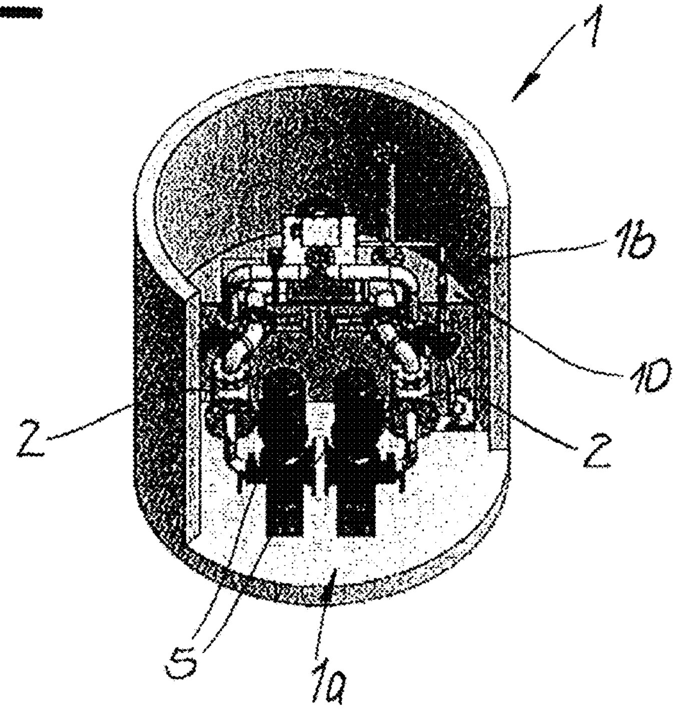
Figure 5:
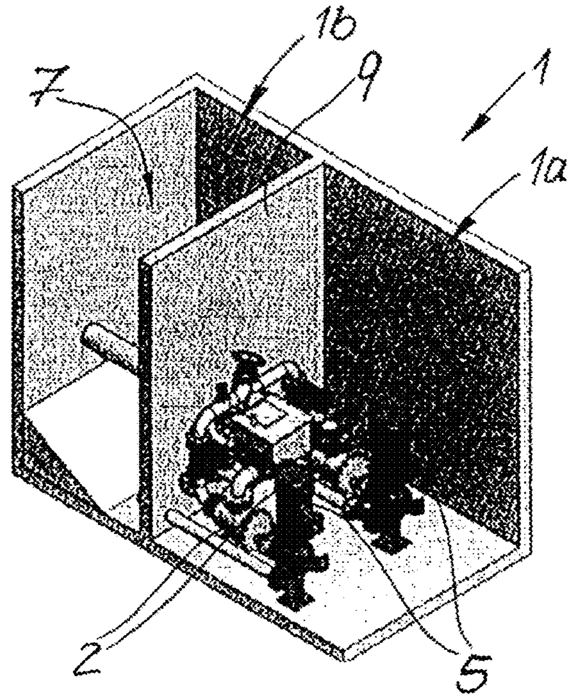
Figure 6:
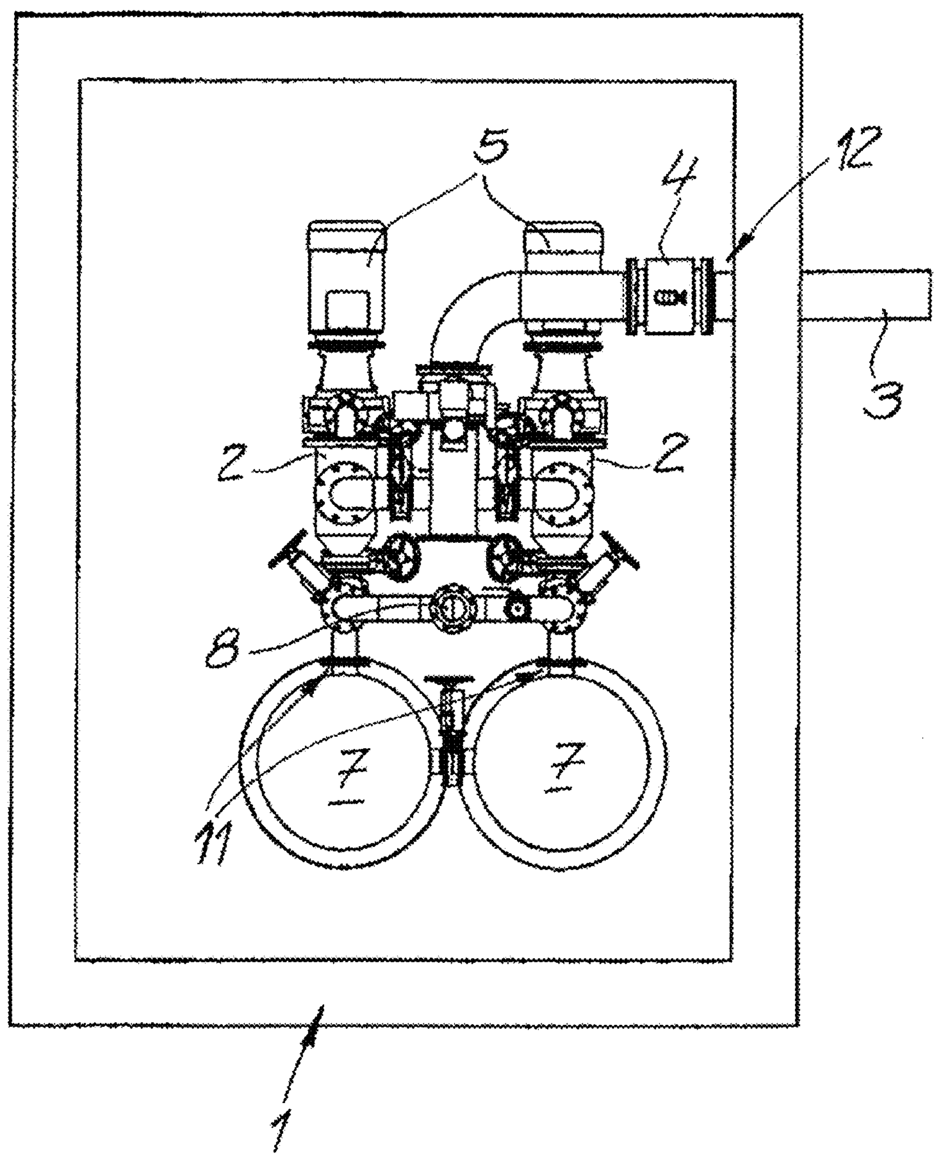

The figures show a wastewater pumping station which is installed or can be installed in a wastewater shaft 1. By way of the embodiments according to FIGS. 4 and 5, it can be seen that the wastewater shaft 1 may be realized in a cylindrical manner (FIG. 4) or also can have a cubic form (FIGS. 5 and 6). In all these cases, the wastewater shaft 1 is produced from concrete.

In its basic design, the wastewater pumping station has a solids collecting tank 2. Two solids collecting tanks 2 which can be operated in an alternating manner, as is described in principle in generic European patent document no. EP 1 108 822 A1, are realized according to the embodiment. Solids located in the wastewater are held back via the solids collecting tank 2. The wastewater which is loaded with solids is supplied via an intake or an intake pipe 3 and a distributor 4 to the two solids collecting tanks 2.

In the interior of the respective solids collecting tank 2, a separating screen typically ensures that the solids are held back and just pre-filtered wastewater passes by a pump 5, which is assigned to the solids collecting tank 2, and a suction pipe 6 finally into a liquid collecting tank 7. As soon as the pre-filtered wastewater which is stored in the liquid collecting tank 7 has reached a certain level, the pump 5 is activated and sucks in the pre-filtered wastewater by the suction pipe 6. The pump 5 then conducts the wastewater further via the solids collecting tank 2, thereby entraining the solids there to a pressure pipe 8, from where the wastewater pumped in such a manner is supplied, for example, to a wastewater treatment plant for further treatment. This is known in principle, for which purpose reference is made not only to European patent document no EP 1 108 822 A1 but also to International patent document no. WO 2010/025852 A1 presented by the applicant.

Figure 1:
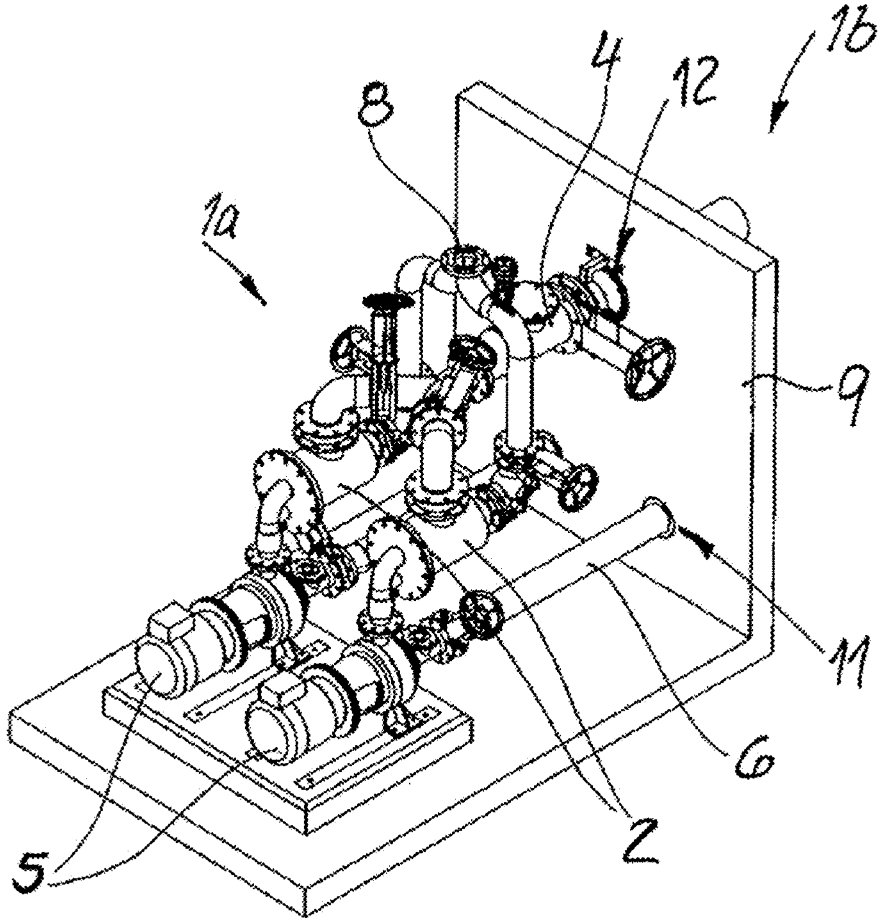
FIG. 1 shows a perspective representation of the wastewater pumping station according to an embodiment of the invention.

The liquid collecting tank 7 and the pump or the two pumps 5 are realized in each case as separately produced assemblies. In addition, according to the invention, at least the solids collecting tank 2 or the two solids collecting tanks 2 and the pump 5 define a prefabricated construction unit 2, 4, 5, 6, 8, to which are also added in the embodiment and in a non-restricting manner the distributor 4, the suction pipe 6 and the pressure pipe 8. Said construction unit 2, 4, 5, 6, 8 can be seen in particular in FIG. 1.

The relevant construction unit 2, 4, 5, 6, 8, which is prefabricated for example by the manufacturer or at the factory, is combined with the liquid collecting tank 7, which is already present on site, during the course of the installation of the construction unit 2, 4, 5, 6, 8 into the wastewater shaft 1, which is also already present on site. In this case, the liquid collecting tank 7 has been integrated on site into the wastewater shaft 1.

This is because this purpose, the liquid collecting tank 7 and the wastewater shaft 1 in the exemplary embodiment are produced for the most part from uniform materials. This is applicable at any rate to the two realization variants according to FIGS. 4 and 5. Effectively, the design there is such that the wastewater shaft 1 is divided by a partition wall 9 into a dry chamber 1*a* and a wet chamber 1*b*. The construction unit 2, 4, 5, 6, 8 is situated in the dry chamber 1*a*.

In contrast, the wet chamber 1*b* receives the liquid collecting tank 7 provided there or the wet chamber 1*b* and the liquid collecting tank 7 coincide. An upwardly open tub is defined by a partition wall 9 (produced from concrete), in the wastewater shaft 1 (also produced from concrete). The upwardly open tub can be closed by way of a removable cover 10 which is produced, for example, from concrete or metal, such that overall as a result a closed liquid collecting tank 7 is available.

The construction unit 2, 4, 5, 6, 8 and the liquid collecting tank 7 are consequently separated from one another in the wastewater shaft 1 by the partition wall 9. In addition, at least one interface 11, 12 is provided in or on the partition wall 9. The interface 11, 12 is a tube connecting piece or a tube coupling in conjunction with seals if necessary. In addition, flanges and/or adapters can also be provided as component parts of the interface 11, 12.

In the case of the exemplary embodiment according to FIG. 6, a partition wall 9 is not provided in the interior of the wastewater shaft 1 at that location. Rather, two (or also more) liquid collecting tanks 7, which in this case are realized or can be realized in each case as metal tanks, are situated in the interior of the wastewater shaft 1. The two liquid collecting tanks 7 can be connected together. In this respect, once again alternating operation of the two construction units 2, 4, 5, 6, 8 is just as possible as already described with reference to the exemplary embodiment according to FIGS. 4 and 5.

Within the framework of the exemplary embodiment, the construction unit 2, 4, 5, 6, 8 and the liquid collecting tank 7 are coupled together by the interface 11, on site. That is to say the connection between the construction unit 2, 4, 5, 6, 8 and the liquid collecting tank 7 by the interface 11 is not effected until at the site of installation. When the construction unit 2, 4, 5, 6, 8 is placed in the wastewater shaft 1 in order to become coupled by the interface 11 with the liquid collecting tank 7 which is already present on site.

Figure 2:
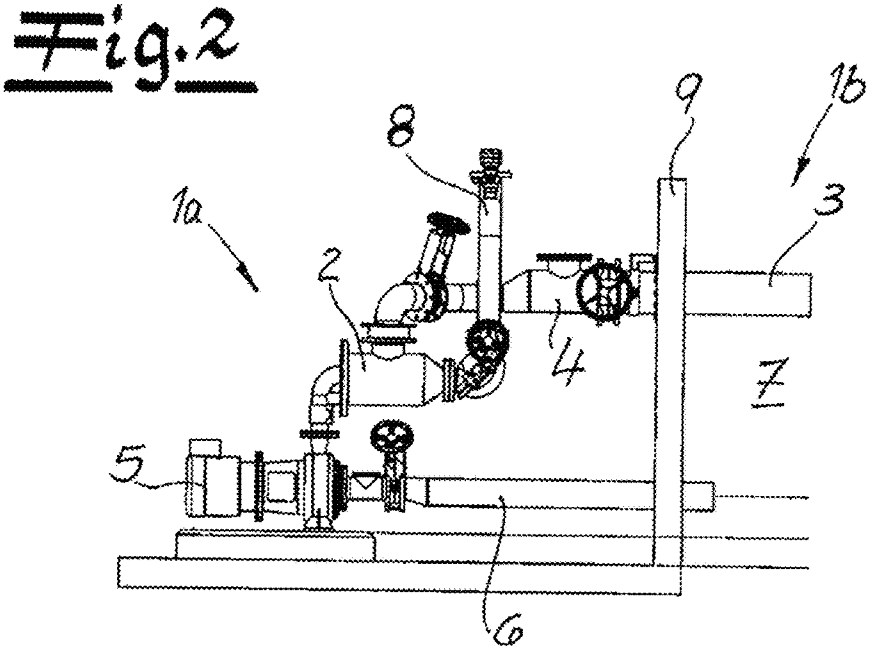
FIG. 2 shows a longitudinal section through FIG. 1.
Figure 3:
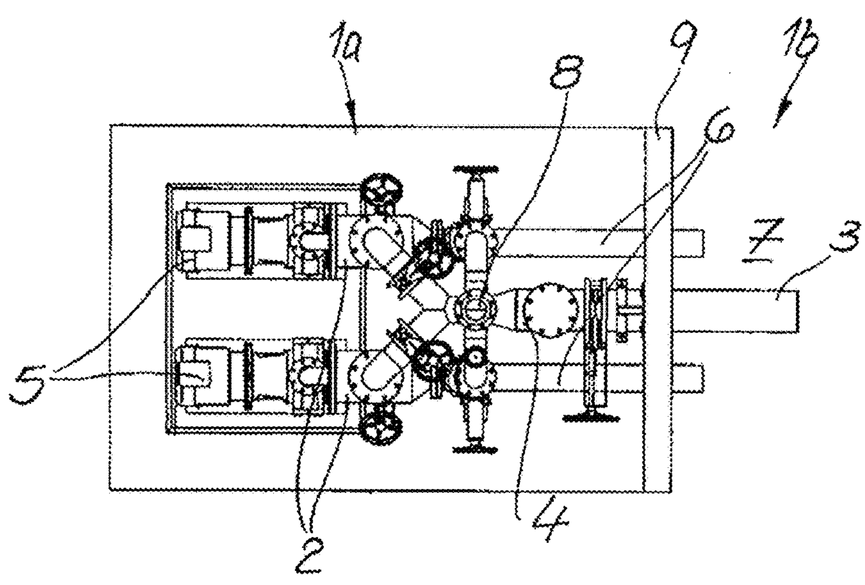
FIG. 3 shows a top view of the object according to FIGS. 1 and 2 and FIGS. 4 to 6 show three different variants of the wastewater pumping station according to FIGS. 1 to 3, installed in a wastewater shaft.

The interface 12, in contrast, serves for coupling the intake or the intake pipe 3 with the distributor 4 or with the two solids collecting tanks 2. It is possible in this way for the intake or the intake pipe 3 to be able to be passed through the liquid collecting tank 7, as is immediately clear in particular by way of FIGS. 2 and 5. As a result of this, it is possible to realize the wastewater shaft 1 with only a small installation height because the intake height to the construction unit 2, 4, 5, 6, 8 is clearly reduced within the framework of the invention compared to the prior art.

The construction unit 2, 4, 5, 6, 8 is produced overall from metal, for example stainless steel. In principle, however, plastics material can also be used as a possible material within the framework of the invention. In contrast, the wastewater shaft 1, and with it for the most part the liquid collecting tank 7, is produced overall from concrete. The removable cover 10 may consist of and be produced from metal.

As already explained in the introduction, the construction unit 2, 4, 5, 6, 8 is prefabricated at the factory or by the manufacturer and transported to the installation site. The wastewater shaft 1 and the liquid collecting tank 7 are situated at the installation site. This is because, in the exemplary embodiment according to FIGS. 4 and 5, the partition wall 9 is established in the wastewater shaft 1 and the liquid collecting tank 7, which is defined in such a manner, is able to be closed finally by the removable cover 10. This may be effected in a pressure-tight manner. A pressure-tight design can also be seen in the case of the two liquid collecting tanks 7 according to FIG. 6 which are also already present on site in the wastewater shaft 1 and are combined at the installation site with the construction unit 2, 4, 5, 6, 8 which has been prefabricated at the factory or by the manufacturer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for setting up a wastewater pumping station in a wastewater shaft, comprising the acts of:

producing as separate assemblies at least one solids collecting tank configured to receive wastewater containing solids, a liquid collecting tank configured to receive wastewater from the at least one solids collecting tanks from which the solids have separated, and a pump configured to transfer the wastewater received by the liquid collecting tank through the at least one solids collecting tank;

prefabricating at least the pump and the at least one solids collecting tank as a construction unit;

combining the liquid collecting tank and the construction unit at a site of the pumping station.

2. The method as claimed in claim 1, wherein the liquid collecting tank is integrated into the wastewater shaft.

3. The method as claimed in claim 2, wherein the liquid collecting tank and the wastewater shaft are produced from uniform materials.

4. The method as claimed in claim 1, wherein the construction unit and the liquid collecting tank are separated from one another in the wastewater shaft by a partition wall.

5. The method as claimed in claim 4, wherein the partition wall divides the wastewater shaft into a dry chamber for the construction unit and a wet chamber for the liquid collecting tank.

6. The method as claimed in claim 5, wherein the construction unit and the liquid collecting tank are coupled together at the site of the pumping station by at least one interface.

7. The method as claimed in claim 6, wherein the interface is mounted at least one of in and on the partition wall.

8. The method as claimed in claim 7, wherein an intake for the construction unit is conducted through the liquid collecting tank.

9. The method as claimed in claim 8, wherein the construction unit and the wastewater shaft are produced from different materials.

10. A wastewater pumping station, comprising:

a solids collecting tank configured to receive wastewater containing solids;

a liquid collecting tank configured to receive wastewater from the at least one solids collecting tanks from which the solids have separated;

a pump configured to transfer the wastewater received by the liquid collecting tank through the at least one solids collecting tank; and a wastewater shaft configured to contain the solids collecting tank, the liquid collecting tank and the pump, wherein the solids collecting tank, the liquid collecting tank and the pump are separately produced assemblies, at least the solids collecting tank and the pump are prefabricated to form a construction unit configured to be combined with the liquid collecting tank in the wastewater shaft at a site of the pumping station.

* * * * *